(12) United States Patent
Grassi (10) Patent No.: US 8,301,363 B2
(45) Date of Patent: Oct. 30, 2012

(54) SYSTEM AND METHOD FOR DETECTION OF AVERAGE SPEED OF VEHICLES FOR TRAFFIC CONTROL

(75) Inventor: Nicola Grassi, Monteroni d'Arbia (IT)

(73) Assignee: Eng Celeritas S.R.L., Milan (IT)

( * ) Notice: Subject to any disclaimer, the term of this patent is extended or adjusted under 35 U.S.C. 154(b) by 172 days.

(21) Appl. No.: 12/312,239

(22) PCT Filed: Oct. 16, 2007

(86) PCT No.: PCT/IB2007/054205
§ 371 (c)(1),
(2), (4) Date: Apr. 1, 2011

(87) PCT Pub. No.: WO2008/041210
PCT Pub. Date: Apr. 10, 2008

(65) Prior Publication Data
US 2011/0313644 A1    Dec. 22, 2011

(51) Int. Cl.
*G08G 1/054* (2006.01)
(52) U.S. Cl. .................................. 701/119; 382/198
(58) Field of Classification Search ............. 701/119, 701/117; 382/100, 176, 198, 103–107, 161, 382/169, 171, 172, 174, 200, 270, 292; 348/149, 348/135, 159, 236; 340/937
See application file for complete search history.

(56) References Cited

U.S. PATENT DOCUMENTS

| 5,809,161 | A  | * | 9/1998 | Auty et al. ................. 382/104 |
| 6,101,274 | A  | * | 8/2000 | Pizano et al. ............... 382/176 |
| 6,178,417 | B1 |   | 1/2001 | Syeda-Mahmood |
| 6,587,586 | B1 |   | 7/2003 | Cui et al. |
| 6,754,369 | B1 | * | 6/2004 | Sazawa ....................... 382/105 |

FOREIGN PATENT DOCUMENTS

| EP | 1276086       | 1/2003  |
| WO | WO0135372     | 5/2001  |
| WO | WO 02/082400  | 10/2002 |
| WO | WO 2004/042673| 5/2004  |

* cited by examiner

*Primary Examiner* — Thomas Black
*Assistant Examiner* — Marthe Marc-Coleman
(74) *Attorney, Agent, or Firm* — Stetina Brunda Garred & Brucker (57) ABSTRACT

The invention relates to a method and a system for identifying moving objects by employing a tag, said tag comprising at least alphanumeric characters and said tag being extracted from pictures taken by cameras located in at least two different points within a certain distance comprising extracting alphanumeric characters of said tag from the pictures taken by at least two cameras; converting said alphanumeric characters into other new characters of another representation space; creating a string of said new characters for each of the tags extracted from the pictures taken by the cameras at different locations, said cameras being synchronized and said pictures taken by the cameras within a predetermined time interval; comparing the strings by associating a correlation score; inputting a threshold score; identifying the moving object if the correlation score is over the predetermined threshold score.

19 Claims, 10 Drawing Sheets

Fig. 1

Fig. 1 Monitoring system

Fig. 2.a rear views

Fig. 2.b front views

Fig. 2.c rear and front views

Fig. 2.d front and rear views

Fig. 2 The camera of the peripheral units can gather a front view as well as a rear view of the vehicles.

Fig. 3 Mapping of plate characters in the PM character set

Fig. 4.a Mapping of characters typical of the Italian plates in the PM character set Fig. 4.b Mapping of characters typical of the Italian, French and German plates in the PM character set Fig 5.a Picture taken at the peripheral unit B    Fig 5.b Picture taken at the peripheral unit A Fig 5   Pictures of a vehicle transiting in the monitored road Fig 6.a Picture taken at the peripheral unit B    Fig 6.b Picture taken at the peripheral unit B Fig 6.c Picture taken at the peripheral unit B    Fig 6.d Picture taken at the peripheral unit B Fig 6.e Picture taken at the peripheral unit B    Fig 6.f Picture taken at the peripheral unit B Fig 6   Pictures of a vehicle transiting in the monitored road Fig. 7 Example of how different characters can be mismatched because of noise in the picture: 0 and O; B and 8

Fig 8.a Block Diagram describing speed violation routine

Fig 8.b Block Diagram describing Plate Matching algorithm routine between two PM strings Fig 8.c Block Diagram describing Plate Matching algorithm analyzing results routine Fig 8 Block Diagram describing Plate Matching algorithm

SYSTEM AND METHOD FOR DETECTION OF AVERAGE SPEED OF VEHICLES FOR TRAFFIC CONTROL

FIELD OF INVENTION

This invention is a system for detecting the average speed of vehicles for traffic control purposes, specifically for the detection of vehicles responsible of an infraction of the speed limit.

The system comprises couple of peripheral units able to detect the transit of vehicles and a central unit, in communication with the peripheral units, which acquires the data relative to the vehicle transit and computes the average speed of the vehicle in the monitored road. The central unit acquires the pictures of the vehicles and ascertains eventual infractions. The pictures of the vehicles are later delivered to the inspecting personnel that ultimately decide the presence of an infraction and start the sanctioning procedure.

BACKGROUND OF THE INVENTION

The invention relates to a system for traffic monitoring that aims at discouraging drivers to break the speed limits. The system identifies as speeding vehicles the vehicles that have had an average speed over the limit fixed for the monitored road. On the contrary, vehicles that have only temporarily passed the speed-limit, for example because of a quick and limited acceleration associated to an overtaking manoeuvre are not considered as speeding vehicles.

The system is therefore much more fare for the drivers, since it avoids the detested concept of speed-trap, and also for the authorities that with this system will be able to identify drivers that have kept a speed over the limit for at least a good fraction of the monitored road.

Other advantage of the system is that it is also much more secure for what concerns the traffic conditions. In fact, by checking the average speed of vehicles, it is possible to avoid typical sudden changes of the driving conduct, like for example abrupt breakings of drivers when they suddenly identify the location of a speed camera and also the consequent re-acceleration once passed the check-point.

With this system instead, the driver is forced to keep a prudent behaviour for the whole road distance monitored, which is ultimately the aim of speed-checking.

The system works automatically 24/hours a day and it guarantees the protection of privacy data since only the images relevant to speeding cars are sent to the central unit and the relevant authority officers.

The closest prior art to this invention is the average speed monitoring system disclosed in EP1276086. The system disclosed in EP1276086 is based on a statistical analysis of the characteristics of the vehicles in transit, and it is based on the low probability of vehicle mismatching, given the fact that the transit of vehicles usually happens in a limited amount of time between the two peripheral units.

The system proposed in EP1276086 goes beyond traditional vehicle identification systems, like the one in WO02082400 or WO2004/042673, mainly based on vehicle identification via an unequivocal identification of the plate of the vehicle. It is known and it is also explained in EP1276086 that an accurate identification of the car plate is very difficult for a number of reasons: change of illumination during the day and sometimes even between the remote locations A and B (see FIG. 2) because of sudden weather changes or because of different lighting conditions, or lack of reliable plate recognition system since plates, and characters, are different for the different countries.

For example German plates have the "o" that resembles a zero, the difference being a small cut on the zero; this small cut is though very difficult to be detected when there is a bit of noise on the images. Moreover German plates have two small circles between the part that identifies the city and the vehicle identification string. British plates have bigger numbers and different colours, as well as the Danish plates and so on. In order to identify correctly all these plates a specific algorithm should be used for each of the plate typology and this would be too onerous from the computational point of view.

Figure 2:
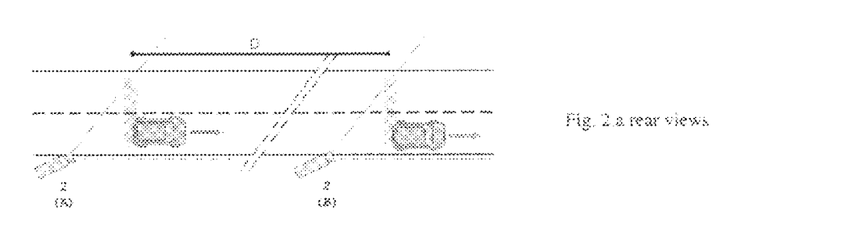
FIG. 2 represents the possible displacements of peripheral units for road monitoring

The system and method of EP1276086 solves the failure of the previous systems by not unequivocally identifying the vehicles. It exploits some information relevant to the vehicle, such as dimension, colour, location of spots on the car and in this way it identifies the characteristics of the vehicle at the first and second remote unit, where the vehicles pictures are taken only with a rear view as in FIG. 2.a.

In EP1276086 it is though not clearly explained how these vehicle characteristics are compared and used for the vehicle identification.

The method and system of the present invention overcomes the limitations of EP1276086 by exploiting a technology that in the following we will name as Plate Matching (PM). The technology of plate matching allows the establishing of correspondences between the plates detected by the peripheral units A and B without any limitation to the letter fonts used in a specific country.

SUMMARY OF THE INVENTION

According to one embodiment the present invention relates to a method for identifying moving objects by employing a tag, said tag comprising at least alphanumeric characters and said tag being extracted from pictures taken by cameras located in at least two different points within a certain distance, said cameras being synchronized and said pictures taken by the cameras within a predetermined time interval. The method comprises:
  extracting alphanumeric characters of said tag from the pictures taken by at least two cameras
  converting said alphanumeric characters into other new characters of another representation space;
  creating a string of said new characters for each of the tags extracted from the pictures taken by the cameras at different locations,
  comparing the strings by associating a correlation score;
  inputting a threshold score;
  identifying the moving object if the correlation score is over the predetermined threshold score.

In this way it is solved the problem of the need of the identification of the alphanumeric tag associated to the moving object; in fact the prior art methods based on a precise identification of this tag often fail, since pictures where this alphanumeric tag is present can often be affected by various kind of noise, or for example have different illumination. The comparison of the alphanumeric tag via a correlation is much more efficient and solves in a more reliable way the problem of a correct identification of alphanumeric tags associated to moving objects.

The method may use another representation space having a number of elements which is lower than the number of elements of the representation space of the original characters.

The function that converts said at least alphanumeric characters into new characters of another representation space may be non bijective.

Preferably, a predetermined time interval is used that is lower than a predetermined threshold Time_h and higher than a predetermined threshold Time_1, where the threshold Time_h is the time needed for the moving object to cover said certain distance at a predefined speed limit and the threshold Time_1 is the time needed for the moving object to cover said certain distance at a speed at least two times higher than said predefined speed limit.

The method may preferably comprise sending the pictures of the speeding objects to the law enforcement authorities.

The method may further comprise objects classification so that it is possible to associate different speed limits to different class of moving objects, preferably cars or trucks.

The pictures may be taken from the said cameras comprise only a partial tag.

The pictures taken by each camera may be a picture of the front or of the back of the moving object.

The present invention further provides a system for identifying moving objects comprising at least a couple of peripheral units (2) able to detect the transit of the moving objects, a central unit (1) comprising computing means, a screen (3), communication means with the peripheral units (2), acquiring means of data tags relative to the moving objects transit, said data tags comprising at least alphanumeric characters, wherein the peripheral units comprise:

synchronization means (23) able to synchronize pictures taken by the cameras with a corresponding string of new characters of new character string; and storing means for temporarily storing said string of new characters and the picture, before these being sent to the central unit;

computing means, wherein said computing means of said peripheral units convert said alphanumeric characters into new characters of another representation space and create a string of said new characters for each of the tags extracted from the pictures taken by said peripheral units; and in that said computing means of said central unit (1) associate the picture of each peripheral unit with the string of the new representation space and carry out a scoring algorithm from said created strings of new characters to identify the moving object.

The system may further comprise
induction coils with signal processing interface,
photoelectric cells with signal processing interface,
magnetic micro loops with signal processing interface,
lasers with signal processing interface,
infrared sensors with signal processing interface,
camera equipped with motion detection technique directly onboard, or
camera with signal processing equipment able to apply a motion detection technique.

The system for identifying moving objects may further comprise an illumination system (22) or an infrared system for operatively use in absence of natural lighting or artificial lighting of the road.

The system may further comprise employing satellite services to synchronize the clocks of the various peripheral elaboration units.

The system may further comprise peripheral unit with at least one elaboration unit (27) enabled to classify vehicles so that it is possible to associate different speed limits to different class of vehicles.

The system may further comprise means for displaying on the screen the string associated to said tag of said moving object.

The system may further comprise cameras that can be set to take pictures of the front or of the back of the moving objects.

BRIEF DESCRIPTION OF THE DRAWINGS

FIG. 3 is an example of the mapping of characters FIG. 4 comprises examples of Mapping of characters typical of the Italian, French and German plates in the PM character set FIG. 5 comprises examples of camera shots taken by the peripheral units of transiting vehicles FIG. 6 comprises examples of camera shots of transiting vehicles, taken in the darkness or with only a partial plate FIG. 7 is an example of how different characters can be mismatched because of noise in the picture FIG. 8.$a$ represents the Block diagram describing speed violation routine FIG. 8.$b$ represents the Block Diagram describing Plate Matching algorithm routine between two PM strings FIG. 8.$c$ Block Diagram describing Plate Matching algorithm analyzing results routine

DETAILED DESCRIPTION OF THE INVENTION

The system (see FIG. 1) comprises couples of peripheral units (2) able to detect the transit of vehicles and a central unit (1), in communication with the peripheral units (2), which acquires the data relative to the vehicle transit and computes the average speed of the vehicle in the monitored road.

Figure 1:
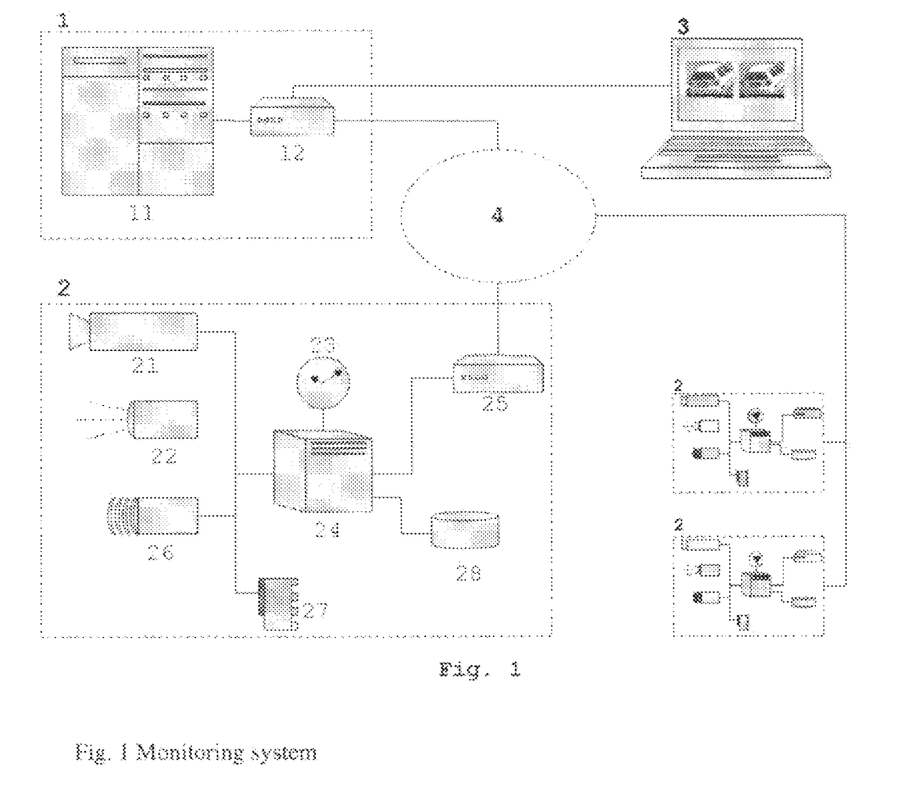
FIG. 1 is a schematic diagram of the system

The central unit (1) acquires also the vehicles pictures via the telecommunication network (4) that later will be delivered to the inspecting personnel. It is the inspecting personnel that checks the vehicles pictures (3) and ultimately decides the presence of an infraction and starts the sanctioning procedure.

The said peripheral units comprise:
a camera (21) (black/white or colour, digital or analogue) to acquire images relevant to the vehicles in transit,
a computing system (24) able to apply on the acquired images signal processing algorithms typical of the technology necessary for Plate Matching.
storing means (28) for temporarily storing the results of the image processing before said results being sent to the central unit and storing means for storing the images until they are sent to the central unit
At least a device able to detect the transit of vehicles (26) comprising for example induction coils (and relevant signal processing interface) or photoelectric cells (and relevant signal processing interface) or magnetic micro loops (and relevant signal processing interface), or lasers or infrared sensors (and relevant signal processing interface), or camera equipped with motion detection technique directly onboard or camera with signal processing equipment able to apply a motion detection technique.
An illumination system (22) or an infrared system for operability in absence of natural lighting or artificial lighting of the road
A synchronization system (23), typically based on satellite services such as GPS or GALILEO, needed to synchronize the clocks of the various peripheral elaboration units A communication system (25) to enable the communication of data between the peripheral and the central unit.

The peripheral unit may also comprise at least one elaboration unit (27) enable to classify vehicles so that it is possible to associate different speed limits to different class of vehicles (cars or trucks for example) according to the traffic laws valid on that specific road.

The monitoring system based on the Plate Matching works as follows.

The road to be monitored is delimited by two peripheral units (see FIG. 2). These peripheral units detect the transit of vehicles and acquire the images of the vehicles. The pictures of the vehicles can be the front of the vehicle or the back of the vehicles and can be different for the two peripheral units (one takes the front, the other the back). The peripheral units elaborate the information necessary to the automatic evaluation of the vehicle correspondence and transmit the information to the central unit.

Once the central unit has established that the average speed is over the speed limit, it requires the images of the vehicle to the peripheral units; the peripheral units will transmit the required images. The other images, relative to the vehicles below the speed limit, are erased at the peripheral units.

Summarizing: the central unit receives live, or with a certain delay, info on the transit of vehicles. It calculates the average speed of vehicles on the monitored road by exploiting: a) the information on the time taken by the vehicle to move between the two remote peripheral units and b) the distance between the two remote peripheral units. Therefore the central unit is able to detect whether the average speed of the vehicle has been over the speed limit. Once the delinquent vehicle has been identified, the central unit connects to the peripheral units asking the transmission of the images of the relevant vehicle, and the erasing of the info relevant to the vehicles below the speed limit.

The images of the delinquent vehicles are then stored on the server at the central unit. They will be used by an authorized officer that will verify their correctness and will start the procedure for the fining process. On the central unit are also stored the data of the distance between the two peripheral remote units. During the installation phase, officers calculate the shortest trajectory that the drivers can take between the two peripheral units and this value is inserted in the central unit. This value can be altered only in case of moving of the peripheral stations or in case of modification of the road.

The method and system of the present invention overcomes the limitations of EP1276086 by exploiting a technology called Plate Matching (PM). This technology establishes correspondences between the plates detected by the peripheral units A and B without any limitation and it works as follows.

Figure 3:
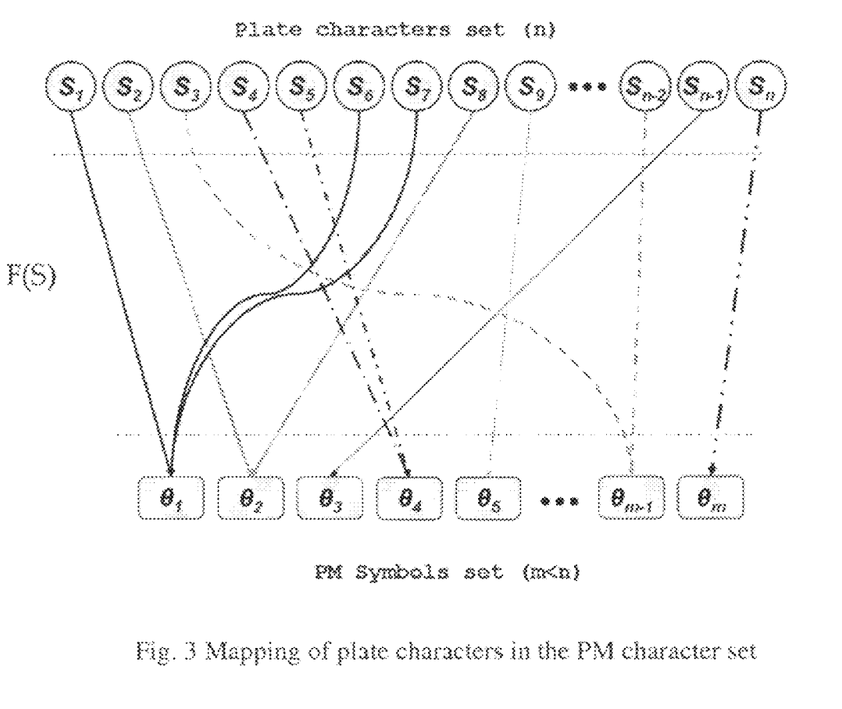

Once the plate is identified, the various elements of the plate (characters and other symbols) are associated to the elements of another alphabet. Formally, it is like applying a non bijective function to the characters of the plate, mapping in this way the characters of the plate into another space, which is therefore not an isomorphism. In this way characters are mapped into similar classes with an extremely low probability of being mismatched (see FIG. 3).

Figure 4:
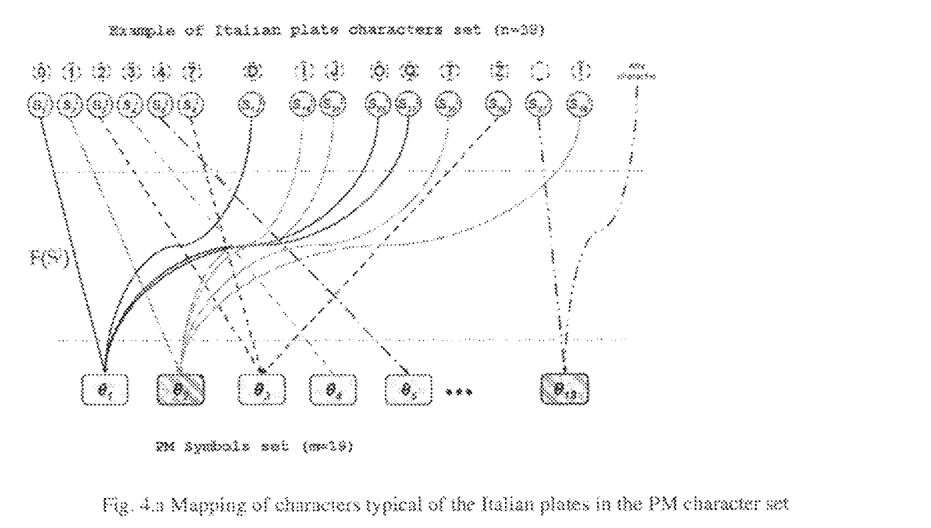

The next example of the Italian plates and FIG. 4 clarify the concept. Italian plates comprise a total of 38 symbols, specifically 37 types of different characters plus a blue indicator that acts as a plate delimiter. The PM alphabet comprises 18 possible symbols plus 1 non-symbol, namely a segmented object that cannot be classified as an alphanumeric element. Therefore, still for the sake of the example, the character of the PM alphabet $\Theta_1$ corresponds to the plate characters 0 (zero), D, O, Q (see FIG. 4.$a$); the character of the PM alphabet $\Theta_2$ comprises the plate characters 1,I,J,T and the plate separator conventionally indicated as! (see FIG. 4.$a$); the character of the set $\Theta_3$ corresponds to the plate characters 2,7,Z (see FIG. 4.$a$); the PM alphabet symbol $\Theta_8$ corresponds to the plate characters 8,B,E,F (see FIG. 4.$a$); the PM alphabet $\Theta_{13}$ corresponds the plate characters K,V,Y,X (see FIG. 4.$a$) and so on. The new alphabet, created on the base of empirical observations, summarizes and synthesizes the alphanumeric characters of the plate.

As previously said and as also recognized by the EP1276086 the main problem in the process of plate recognition is the noise present in real-world images. The source of this noise can be due to illumination changes, dust on the plates, rain, sudden movements, noise of the camera acquisition means and so on.

Figure 7:
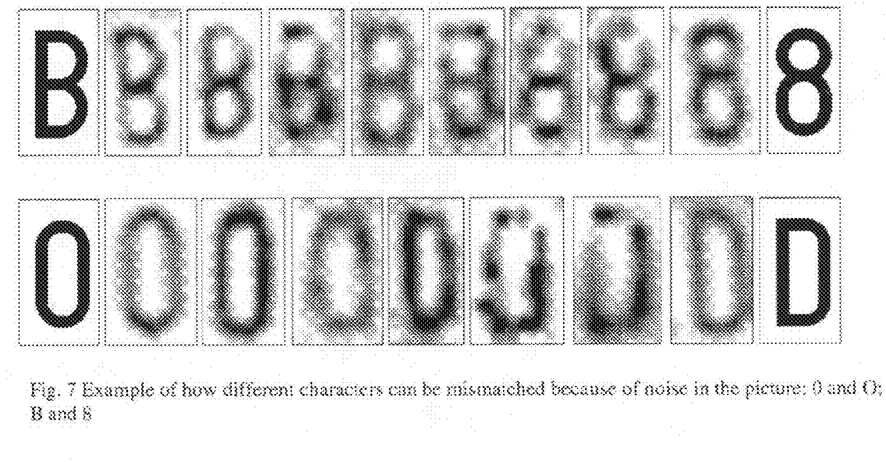

Experimental results have shown that this noise causes miss-classification of the original symbols: for example O (letter o), 0 (zero), D and Q can be easily miss-classified among them. Another case of ambiguity is represented by the B letter and the number 8 (see FIG. 7). This miss-classification due to unavoidable noise presence obviously renders a plate recognition system not reliable. The solution to this problem, and the central essence of this invention, is that it is not important to correctly identify the elements of the plate, but to correctly categorize them.

Therefore the elements O, 0, D, Q are grouped together in the same category: the PM alphabet element $\Theta_1$. In fact, for what the application is concerned, it is not important to unequivocally identify the plate of the vehicle, but just to understand that the same vehicle has passed (in a certain amount of time) from the two surveillance points A and B where the peripheral units are located (see FIG. 2). Therefore the vehicle is not identified anymore in the traditional space as 12XYG, but in the PM alphabet space $\Theta_j \Theta_k \Theta_l \Theta_m \Theta_n$.

In image processing terms the PM symbol $\Theta_1=\{0(\text{zero}), D, O, Q\}$ identifies a round object that is quite different from the $\Theta_3=\{2,7,Z\}$ that identifies a zigzag object. Moreover, this PM alphabet is structured in such a way that the symbols $\Theta_i$ have enough "distance" among them when considered in the framework of the metric used to categorize the vehicles, as it will be explained later.

As previously specified the system works also with characters of other languages (ü, for example is categorized as u) and also with plate characters of other nations (see FIG. 4.$b$). Namely, the A that appears on a German plate is not very different from the A that appears on a French, Italian, Dutch or Swiss plate. They are all characters identified as objects with a pointed shape on the top and all the characters are mapped in the 18+1 symbols of the PM alphabet.

Another problem that the system solves is represented, for example, by the number 4 in the French plates.

This 4, can be an "open" 4 or a "closed" 4, depending on the way it is written, obviously. Well, the "closed" 4 is put in the same category of the elements {A,4}, while the "open" 4 is put in a separate category {4}.

Moreover, all the comparisons of the plates are done considering vehicles that transit from point A to point B corresponding to the two peripheral units.

Assuming that the road is 2 Km long and that the speed limit is fixed to 120 Km/h (what is typical on motorways) there is only a temporal window that makes sense for comparisons. Namely, if the vehicle needs more than 60 s to go from point A to point B, then it is clear that it has not broken the speed limit. Moreover, there is also a speed that can be considered as maximal speed, for example 240 Km/h (since there are not many Ferraris around). In the latter case it means that the vehicle needs 30 s to go from point A to point B. All this implies that the temporal window that makes sense for the comparison of data is only 30 s, namely only the data gathered at a surveillance station within 30 s and 60 s are used.

In a quite busy road with 1800 vehicles/hour (corresponding to 30 vehicles/minute), the comparison, for each car at point B is done with only 15 cars previously registered at point A, minimizing substantially the possibility of a mismatch of the vehicles represented in the PM alphabet.

Moreover, even in the remote case of mismatch, that according to our experiments is less than $1/10^6$, the final control is done by the authorized officer that checks the images of the vehicle before starting the procedure for the final fining process.

The plate matching is applied as follows:

The central unit analyzes the PM strings obtained by the images taken, within a certain timeframe, at the peripheral unit A and unit B. Hereafter it is explained the plate matching process for a case with a lot of noise.

This is an exemplary case where all the traditional algorithms, like the ones disclosed in the mentioned prior art, fail because of the presence of a lot of noise due to an important illumination change.

Figure 5:
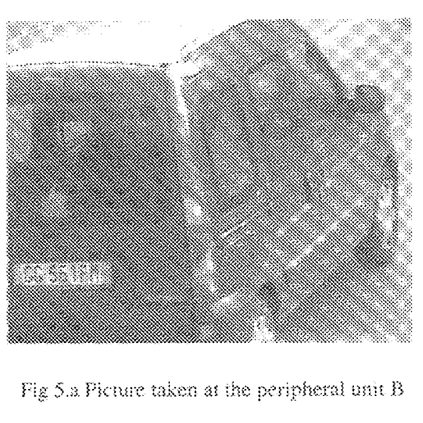

The pictures are the ones in FIG. 5.

The picture in FIG. 5.$a$, relative to the transit of the vehicle in correspondence with the peripheral unit B is identified as follows:

$\Theta_2\Theta_2\Theta_{11}\Theta_{11}\Theta_{19}\Theta_6\Theta_7\Theta_2\Theta_{16}\Theta_{12}\Theta_2\Theta_2$ These PM alphabet symbols represent the following information:

$\Theta_2$ tiny part of the image preceding the plate limiter and identified by the system as an I
$\Theta_2$ plate limiter
$\Theta_{11}$ G character
$\Theta_{11}$ G character
$\Theta_{19}$ space
$\Theta_6$ number 5
$\Theta_7$ number 6
$\Theta_2$ number 1
$\Theta_{16}$ P character
$\Theta_{12}$ M character
$\Theta_2$ plate limiter
$\Theta_2$ tiny image portion preceding the plate limiter and identified as I Applying the same procedure to the image on the left hand side (see FIG. 5.$b$) the following sequence will be obtained:

$\Theta_2\Theta_{11}\Theta_{11}\Theta_{19}\Theta_6\Theta_7\Theta_2\Theta_{16}\Theta_{19}\Theta_2$ These PM alphabet symbols represent the following information:

$\Theta_2$ plate limiter
$\Theta_{11}$ G character
$\Theta_{11}$ G character
$\Theta_{19}$ space (space o other symbol not classified are categorized in the last element of the PM alphabet)
$\Theta_6$ number 5
$\Theta_7$ number 6
$\Theta_2$ number 1
$\Theta_{16}$ P character
$\Theta_{19}$ non symbol
$\Theta_2$ plate limiter In this second case the character $\Theta_2$ is missing because of the tiny portion of the plate that follows the plate separator.

As it is evident from this example, it is not uncommon to compare strings that have different dimensions: in the case of the previous example the first string is formed by 12 elements while the second string is formed by 10 elements.

This is mainly caused by noise that can be originated by the presence of reflections, rain, and darkness and so on. The picture of the example represents an exemplary limit case. The plate matching at this stage compares the two strings by employing a score obtained by making one string to scroll on the other, like a correlation operation.

The matching is calculated via the following formula:

$$\text{rank} = \sum_{i=1}^{C_m} \alpha_i a_i b_i \times \varepsilon$$

where $C_m$ represents the dimension of the shortest string (10 for the previous example), $\alpha_i$ represents the prize/penalty of matching/miss-matching so that it is a positive value if the elements of the two strings are the same and a negative value if they are different. Only the two PM alphabet elements $\Theta_2 = \{1, I, !, J, T\}$ and $\Theta_{19} = \{\text{space, non character}\}$ represent an exception: they comprise some elements of the original characters of the plates that are not real characters (!, space and non-character) and therefore the weight associated is lower when compared to other matching associations.

$a_i$ and $b_i$ indicate the confidence levels in the association of a real character of the plate with an element of the PM alphabet. These confidence levels depend on the image quality and therefore on how clean is the value. Obviously, the cleaner the value the higher the degree of confidence by which a certain character is mapped in the PM alphabet space. The confidence levels are only three, corresponding to high, medium or low confidence. Once again the PM element $\Theta_{19} = \{\text{space, non character}\}$ takes always a certain confidence value that is a value only slightly over the "low confidence value" of all the other elements of the PM alphabet. The rationale behind this is to be explained on the fact that the PM element $\Theta_{19}$ does not really identify an original character of the plate, but only an "extra-character", therefore its weight in terms of information for the identification of the plate is lower when compared to all the other elements of the PM alphabet.

$\varepsilon$ is a normalization factor that frames the values in a predetermined scale interval [0,1] for example.

Of all the positions it is selected the one that provides the highest score, namely the position that corresponds to the best string superposition. If the score is over a prefixed threshold then the two vehicles are considered to be matchable.

The scoring procedure is performed at the central server. At the central server are available also all the strings in the PM alphabet of the cars that passed the point A in a reasonable timeframe, as previously explained. It is worth noticing that the system is compatible also with the restrictions of privacy data that are present in some countries. Indeed the plate data are not stored anywhere but only their PM strings.

Among all the images whose plate correlation is over the threshold, the image of vehicle with the highest score is identified as being the image of the vehicle that has broken the speed limit.

Moreover, if none of the confronted images has given a score over the threshold, then the procedure is repeated without considering the $\Theta_2$ e $\Theta_{19}$ elements, which ultimately add only marginal information of the vehicle plate.

Once the $\Theta_2$ e $\Theta_{19}$ elements are eliminated the matching would be computed between:

$\Theta_{11}\Theta_{11}\Theta_6\Theta_7\Theta_{16}\Theta_{12}$ and $\Theta_{11}\Theta_{11}\Theta_6\Theta_7\Theta_{16}$ and in this case the new threshold of significance has a higher value than the case comprising also the $\Theta_2$ e $\Theta_{19}$ elements. In this case only characters of the original plate are compared. This second case is faced only in the presence of a lot of noise in the original image.

Figure 8:
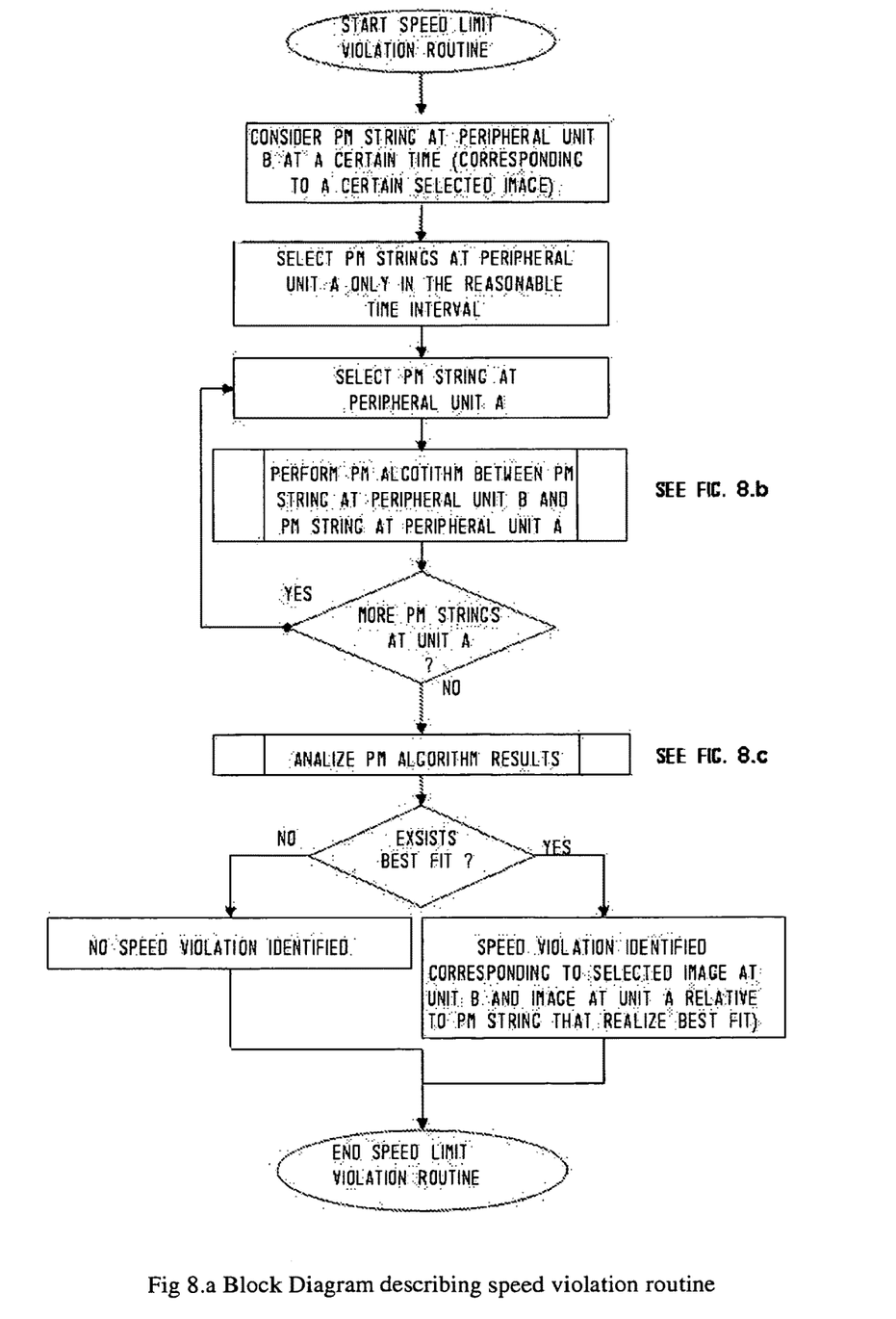

The Plate Matching algorithm is summarized in the block diagrams of FIG. 8a-8c.

Indeed $\Theta_2$ e $\Theta_{19}$ elements may introduce some noise since they might be misinterpreted also because of a certain inclination of the plate of the vehicle in relation to the camera shooting the picture.

Figure 6:
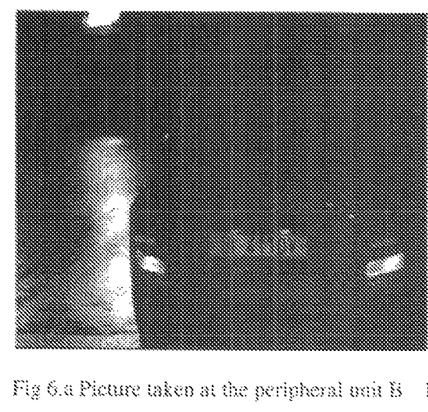

The system works also in other extreme conditions, as the one of the examples in FIG. 6.

The plate of the cars of FIGS. 6a-6d, are taken in the complete obscurity. The Plate Matching recognition system just disclosed works also in such limit situations since no information on car colour or shape are needed. Indeed in the complete obscurity only the plate can be distinguish and exploited and no information can be extracted on other features of the vehicle like colours or shape, like for example in FIGS. 6c-6d. Moreover, since the system is conceived for plate matching in noisy environment (like the pictures taken in the example in FIGS. 6c-6d), it works also with low definition camera and not necessarily with high definition cameras where the image needs to be as neat as possible. The system works also in other limit circumstances like the pictures of FIG. 6e-6d where the plate shot in the first picture is only partial. Indeed thanks to the partial string comparison mechanism, even these cases are correctly identified.

The invention claimed is:

1. A method for identifying a moving object by employing a tag, said tag comprising at least alphanumeric characters and said tag being extracted from pictures taken by cameras located in at least two different points within a certain distance, said cameras being synchronized and said pictures taken by the cameras within a predetermined time interval; said method comprises extracting alphanumeric characters of said tag from the pictures taken by at least two cameras, said alphanumeric characters forming elements of a first representation space; the method being characterized in that it further comprises:
    converting said alphanumeric characters of the first representation space into other new characters of a second representation space;
    creating a string of said new characters for each of the tags extracted from the pictures taken by the cameras at different locations;
    comparing the strings by associating a correlation score;
    inputting a threshold score;
    identifying the moving object if the correlation score is over the predetermined threshold score.

2. The method of claim 1 wherein the second representation space has a number of elements which is lower than the number of elements of the first representation space.

3. The method of claim 2 wherein said predetermined time interval is lower than a predetermined threshold Time_h and higher than a predetermined threshold Time_1, said threshold Time_h being the time needed for the moving object to cover said certain distance at a predefined speed limit and said threshold Time_1 being the time needed for the moving object to cover said certain distance at a speed at least two times higher than said predefined speed limit.

4. The method of claim 3 wherein the identified moving object is considered as a speeding object and the pictures are sent to the law enforcement authorities.

5. The method of claim 4 wherein different moving objects are classified so that it is possible to associate different speed limits to different class of moving objects, preferably cars or trucks.

6. The method of claim 2 wherein the pictures taken from the said cameras comprise only a partial tag.

7. The method of claim 2 wherein said picture taken by each camera can be a picture of the front or of the back of the moving object.

8. The method of claim 1 wherein the function that converts said at least alphanumeric characters into new characters of the second representation space is non bijective.

9. The method of claim 8 wherein said predetermined time interval is lower than a predetermined threshold Time_h and higher than predetermined threshold Time_1, said threshold Time_h being the time needed for the moving object to cover said certain distance at a predefined speed limit and said threshold Time_1 being the time needed for the moving object to cover said certain distance at a speed at least two times higher than said predefined speed limit.

10. The method of claim 8 wherein the pictures taken from the said cameras comprise only a partial tag.

11. The method of claim 8 wherein said picture taken by each camera can be a picture of the front or of the back of the moving object.

12. A system for identifying a moving object comprising at least a couple of peripheral units able to detect the transit of the moving objects, a central unit comprising a computing system, a screen, a communication system with the peripheral units a camera for acquiring data tags related to the moving object transit, said data tags comprising at least alphanumeric characters forming elements of a first representation space, wherein the peripheral units comprise cameras taking pictures and a synchronization system for synchronizing the pictures taken by the cameras with a corresponding string of new characters; an electronic memory unit for temporarily storing said string of new characters and the picture, before the strings of new characters and the pictures being sent to the central unit and computing system; characterized in that:
    said computing system of said peripheral units convert said alphanumeric characters of the first representation space into new characters of a second representation space and create a string of said new characters for each of the tags extracted from the pictures taken by said peripheral units; and
    said computing system of said central unit associate the picture of each peripheral unit with the string of said second representation space and carry out a scoring algorithm from said created strings of new characters to identify the moving object.

13. The system for identifying moving objects of claim 12 further comprising:
    induction coils with signal processing interface,
    photoelectric cells with signal processing interface,
    magnetic micro loops with signal processing interface,
    lasers with signal processing interface,
    infrared sensors with signal processing interface,
    camera equipped with motion detection technique directly onboard, or
    camera with signal processing equipment able to apply a motion detection technique.

14. The system for identifying moving objects of claim 12 further comprising an illumination system (22) or an infrared system for operatively use in absence of natural lighting or artificial lighting of the road.

15. The system for identifying moving objects of claim 12 wherein the synchronization system (23), employs satellite services to synchronize the clocks of the peripheral units.

16. The system for identifying moving objects of claim 12 wherein the peripheral unit comprises at least one elaboration unit (27) enabled to classify vehicles so that it is possible to associate different speed limits to different class of vehicles.

17. The system for identifying moving objects of claim 12 wherein a display is provided for displaying on the screen the string associated to said tag of said moving object.

18. The system for identifying moving objects of claim 12 wherein said cameras can be set to take pictures of the front or of the back of the moving objects.

19. An article of manufacture comprising a non-transitory program storage medium readable by a computer the medium tangibly embodying one or more programs of instructions executable by the computer to perform a method for identifying a moving object by employing a tag, the method comprising the steps of:

converting alphanumeric characters of a first representation space into other new characters of a second representation space:

creating a string of said new characters for each tags extracted from pictures taken by cameras at different locations;

comparing the strings by associating a correlation score;

inputting a threshold score;

identifying the moving object if the correlation score is over a predetermined threshold score.

* * * * *